United States Patent
Harwell (10) Patent No.: US 8,077,038 B2
(45) Date of Patent: Dec. 13, 2011

(54) SYSTEMS AND METHODS FOR RFID SURVEILLANCE

(75) Inventor: Janis Harwell, Seattle, WA (US)

(73) Assignee: Intermec IP Corp., Everett, WA (US)

( * ) Notice: Subject to any disclaimer, the term of this patent is extended or adjusted under 35 U.S.C. 154(b) by 1126 days.

(21) Appl. No.: 11/854,450

(22) Filed: Sep. 12, 2007

(65) Prior Publication Data

US 2011/0273294 A1 Nov. 10, 2011

Related U.S. Application Data (60) Provisional application No. 60/844,152, filed on Sep. 12, 2006.

(51) Int. Cl.
*G08B 13/14* (2006.01)
(52) U.S. Cl. .............. 340/572.1; 340/571; 340/572.4; 340/5.1; 340/5.8; 340/10.42
(58) Field of Classification Search .......... 340/572.1, 340/10.1, 571, 572.4, 5.1, 5.8, 5.92, 10.3, 340/10.4, 10.42, 10.51, 10.52; 235/435
See application file for complete search history.

(56) References Cited

U.S. PATENT DOCUMENTS

| 7,710,269 B2* | 5/2010 | Reep ............... 340/572.1 |
| 2003/0227392 A1 | 12/2003 | Ebert et al. |
| 2005/0289061 A1 | 12/2005 | Kulakowski et al. |
| 2007/0199988 A1* | 8/2007 | Labgold et al. ........ 235/385 |

OTHER PUBLICATIONS

International Search Report for International Application No. PCT/US07/78313, dated Mar. 17, 2008, Applicant Intermec IP Corp. (10 pages).

* cited by examiner

*Primary Examiner* — Toan N Pham
(74) *Attorney, Agent, or Firm* — Perkins Coie LLP (57) ABSTRACT

A RFID monitoring system, which can be used to track and identify RFID tags and tag readers as they are used, can include a computing device including an RFID tag database for storing a list of authorized RFID tags that have been licensed by an intellectual property owner or licensee. The monitoring system may be configured to receive transmitted RFID tag data relating to the location, date, and/or time of detection of tags and other devices. Based on a statistical analysis of this data, the system can determine whether RFID tags and devices are authorized by a rights holder. Other features and embodiments are also disclosed.

27 Claims, 6 Drawing Sheets

SYSTEMS AND METHODS FOR RFID SURVEILLANCE

CROSS-REFERENCE TO RELATED APPLICATION

This application claims priority to U.S. Provisional Application No. 60/844,152, filed Sep. 12, 2006, which is incorporated by reference herein.

BACKGROUND

Counterfeit products impact a wide range of industries, and combating piracy and counterfeit products is an important issue. For example, the Business Software Alliance (BSA) estimates that 35 percent of all software used worldwide is counterfeit, unlicensed, or otherwise illegal. A recent IDC Economic Impact Study found that if the global software piracy rate was lowered by 10 percent over the next four years, this change would contribute 2.4 million new jobs and $400 billion in economic growth to the global economy.

Radio frequency identification ("RFID") chips are becoming increasingly popular in a wide range of industries. RFID tags and tag readers often contain substantial amounts of intellectual property belonging to RFID developers. These RFID tags are often the subject of counterfeiting efforts. Thus, many tags in use around the world may not have been licensed by the intellectual property owner. Additionally, many tag reader devices in use around the world may also not be licensed by the intellectual property owner. Other unauthorized or counterfeit goods exist in the RFID chain, including various telecommunications devices (e.g. network appliances or access points (APs)).

For example, customs officials increasingly find it difficult to detect and identify potential counterfeit goods at border crossings or ports. Therefore, it would be desirable to be able to track and identify the presence of tags and/or the products they are attached to as they both pass together through various locations throughout the world for customs enforcement or national security purposes.

There is a need for a system that overcomes the above problems, as well as providing additional benefits. Overall, the above examples of some related systems and related limitations are intended to be illustrative and not exclusive. Other limitations of existing or prior systems will become apparent to those of skill in the art upon a reading of the following Detailed Description.

DETAILED DESCRIPTION

In a broad range of applications, it would be desirable to approach the counterfeiting and unlicensed usage of RFID products and complementary technology by leveraging a wide area or extremely wide area computer/telecommunications network to increase the visibility of activities involving the use of RFID-enabled products.

In a broad sense, systems and methods for protecting RFID products against counterfeited clones and for performing wide area surveillance of the usage of RFID licensed products are disclosed in detail below. The wide area system and corresponding method disclosed herein are based on principles of improved visibility of some or all activities related to the usage of RFID products and a coordinated analysis of data relating to those activities collected through communication networks.

As described herein, an intellectual property owner may be the owner of one or more patents or other forms of intellectual property covering RFID chips, RFID tags, RFID devices and/or RFID systems. The intellectual property owner may or may not have granted a license to one or more other parties to make, use or sell components of an RFID system. For example, device manufacturers may be licensed by the intellectual property owner (Licensed Device Manufacturers), devices may be licensed by the intellectual property owner (Licensed Devices), network appliances (such as wireless access points or routers) may be licensed by the intellectual property owner (Licensed Network Appliances), and tag manufacturers licensed by the intellectual property owner (Licensed Tag Manufacturers).

As described below, some or all of these components may be tracked through a monitored environment in which one or more devices or network appliances are licensed by the intellectual property owner.

The description herein could be applied to any radio frequency identification system, whether passive or active, regardless of the radio frequency used.

Various examples of the invention will now be described. The following description provides specific details for a thorough understanding and enabling description of these examples. One skilled in the art will understand, however, that the invention may be practiced without many of these details. Additionally, some well-known structures or functions may not be shown or described in detail, so as to avoid unnecessarily obscuring the relevant description.

The terminology used in the description presented below is intended to be interpreted in its broadest reasonable manner, even though it is being used in conjunction with a detailed description of certain specific examples of the invention. Certain terms may even be emphasized below; however, any terminology intended to be interpreted in any restricted manner will be overtly and specifically defined as such in this Detailed Description section.

The headings provided herein are for convenience only and do not necessarily affect the scope or meaning of the claimed invention.

System Architecture Overview

Figure 1:
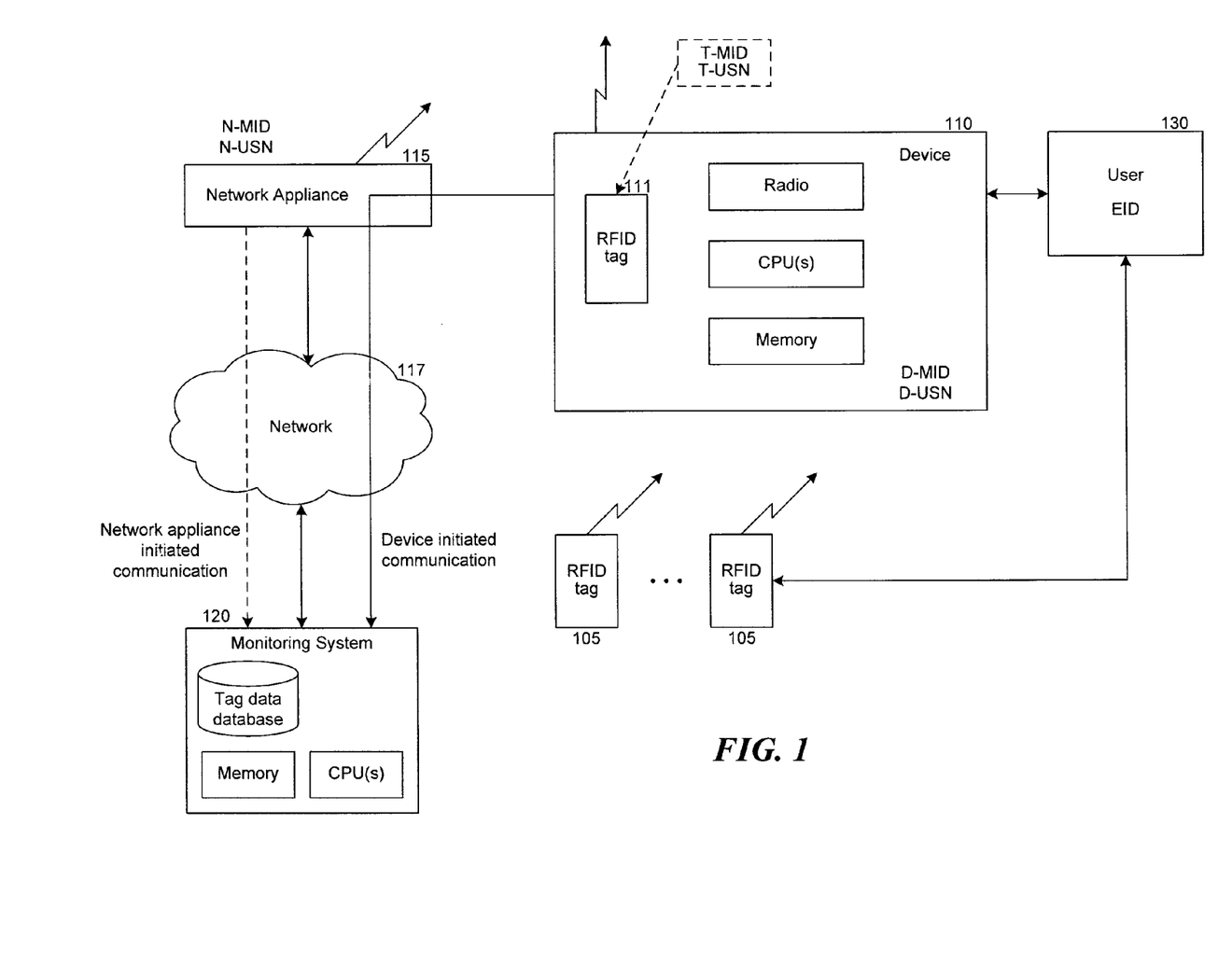
FIG. 1 illustrates an overview of an RFID wide area surveillance system.

FIG. 1 and the following discussion provide a brief, general description of a suitable computing and communication environment in which the invention can be implemented. Although not required, aspects of the invention are described in the general context of computer-executable instructions, such as routines executed by a general-purpose computer, e.g., a server computer, wireless device or personal computer. Those skilled in the relevant art will appreciate that the invention can be practiced with other communications, data processing, or computer system configurations, including: Internet appliances, hand-held devices (including personal digital assistants (PDAs)), wearable computers, cellular or mobile phones, multi-processor systems, microprocessor-based or programmable consumer electronics, set-top boxes, network PCs, mini-computers, mainframe computers, and the like. The terms "computer," "server," "host," "host system," and the like are generally used interchangeably herein, and refer to any of the above devices and systems, as well as any data processor.

Aspects of the invention can be embodied in a special purpose computer or data processor that is specifically programmed, configured, or constructed to perform one or more of the computer-executable instructions explained in detail herein. Aspects of the invention can also be practiced in distributed computing environments where tasks or modules are performed by remote processing devices, which are linked through a communications network, such as a Local Area Network (LAN), Wide Area Network (WAN), or the Internet. In a distributed computing environment, program modules and databases may be located in multiple local and/or remote memory storage devices.

Aspects of the invention may be stored or distributed on computer-readable media, including magnetically or optically readable computer discs, hard-wired or preprogrammed chips (e.g., EEPROM semiconductor chips), nanotechnology memory, biological memory, or other data storage media. Indeed, computer implemented instructions, data structures, screen displays, and other data aspects of the invention may be distributed over the Internet or over other networks (including wireless networks), on a propagated signal on a propagation medium (e.g., an electromagnetic wave(s), a sound wave, etc.) over a period of time, or they may be provided on any analog or digital network (packet switched, circuit switched, or other scheme).

With reference to FIG. 1, the system operates with at least some of the following components: tags 105, one or more devices 110, one or more network appliances 115, and one or more monitoring systems 120. Network appliance 115 can communicate with monitoring system 120 by means of network 117. The following description of each of these components is intended to be non-limiting. Tags 105 can be RFID tags. The tags can be any insert, tag or label with an antenna and a read-only or read/write chip whether slap-and-stick or embedded in a product or in packaging. A tag can have a unique serial number (USN) (global or local) assigned to it. Tags 105 can include a T-MID number, a unique identification number assigned to the tag manufacturer. End user 130 can also be identified by an EID number, a unique identification number assigned to end users of RFID readers, printers and tags. Combined tag data can include the T-MID number, the EID number, and the USN.

Device 110 can be an RFID tag reader and/or RFID printer with embedded RFID reader. The reader can be any fixed or mobile device capable of reading an RFID tag. In the example shown in FIG. 1, device 110 includes a radio for wireless data exchange, as well as memory and one or more processors or CPUs. In some embodiments, the tag reader can be integrated with a network device or appliance, such as that described in more detail below. Device 110 can also include a device tag 111 which can be an RFID tag which is embedded in device 110 and contains device data. Device 110 can include an EID number, a number associated with an RFID reader or an RFID printer. Device 110 can also include a D-MID number, a unique identification number assigned to a device manufacturer. Device data can include a device's D-MID number, the EID number and the USN, which can be stored in the device tag and/or the non-volatile memory of device 110. Programming of devices, tags and other system components could be accomplished at the factory or remotely. It is desirable that this programming be tamper-proof and/or tamper-resistant.

In some embodiments, device 110 can be configured to store a media access control (MAC) address to permit the device to communicate over networks. Note that this MAC address can be used to uniquely identify each particular device. The device may also be associated with a unique Internet protocol (IP) address should it be connected to a network. As described herein, device 110 may gather data from device tags 111 and route gathered/received tag data and other data (such as time and location data) to network appliance 115 based on a predetermined IP address associated with the network appliance.

Network appliance 115 can be any network equipment (e.g., an access point) capable of forwarding RFID tag data to or over a network, such as network 117 (which in this example is an IP network). In some embodiments, network appliance 115 is particularly configured to read RFID tags, including any tags embodied in an RFID device, such as device 110 (although the device could read its own tag and simply forward the data associated with device tag 111).

Network appliance 115 can include an N-MID number: a unique identification number assigned to a manufacturer of a network appliance. Combined network appliance data can include the N-MID number, the EID number, and the USN. In some embodiments, the information related to MIDs and USNs may not be encrypted and may be open to the public. The network appliance 115 can be configured to store a media access control (MAC) address. This MAC address can be used to uniquely identify a particular network appliance.

In some embodiments, the network appliance 115 can be configured to communicate directly with RFID readers such as RFID device 110. This communication can be by a wired or wireless communication means. In other embodiments, device 110 may wirelessly communicate with an intermediate network element such as a base station using a protocol such as, but not limited to, IEEE 802.11. The intermediate network element can be further coupled to network appliance 115 through a wired or wireless means. The network appliance 115 may also be associated with a unique Internet protocol (IP) address as noted above.

As shown in the example of FIG. 1, monitoring system ("monitor") 120 can include memory, one or more processors/CPUs, and an RFID surveillance database where the monitoring system stores tag data and device data transmitted by devices and related information and programs. The database can be any structured collection of records or data that is stored in a computer so that a program can consult it to answer queries. The database can be used to store any of the parameters, data, and resulting statistical analysis described herein.

As explained herein, devices can be programmed to automatically transmit received tag data and device data to a monitoring system such as monitoring system 120. For example, RFID readers may be positioned at ports, border crossings, or other customs locations, as well as in common carrier channels such as at truck weigh stations, truck depots, airports, or private or public facilities such as warehouses, distribution centers, stores, etc. These RFID readers can automatically gather tag data from all RFID tags that come within range, and pass that tag data to monitoring system 120 via network 117.

Monitoring system 120 can include a monitor which may be an operator of the RFID surveillance system. The monitor could be fully automated or a combination of automated and human components, processes or systems. Transmission of tag data to the monitor may be initiated immediately after the device reads a tag or it may be stored by the device and transmitted later. In either case, the transmission may be accomplished by wireless or wired communication means.

When a device enters an environment monitored by a licensed network appliance (e.g., a customs/border crossing, in common carrier channels), the network appliance reads that device's embedded tag and collects and stores and/or transmits the device data to the monitor. Data transmissions made by devices to the monitor need not slow or otherwise disrupt an end user's operation of its RFID system. In some embodiments, these transmissions are not detectable during normal operation of the end user's RFID system. In other embodiments, these transmissions are timed to occur in off-peak periods when end user activities and/or communication volumes are low.

The monitor stores in the RFID surveillance database the data it receives from all devices, including licensed devices, and from licensed network appliances as well as the date and time it received that data. The monitor also collects and stores in the RFID surveillance database data on RFID tags that have been confirmed or are suspected to be unauthorized, unsecured, unauthenticated, cloned, etc. as discussed in more detail below.

Licensed network appliances can be programmed to monitor the tag data transmissions of a device and to classify as "non-compliant" any device which fails to transmit tag data to the monitor shortly before or shortly after it transmits tag data to the end user. Licensed network appliances can also be programmed to read the device tag of non-compliant RFID devices and automatically transmit the device data to the monitor together with its own network appliance data. Programming of network appliances to perform these functions could be accomplished at the factory or remotely.

Figure 2:
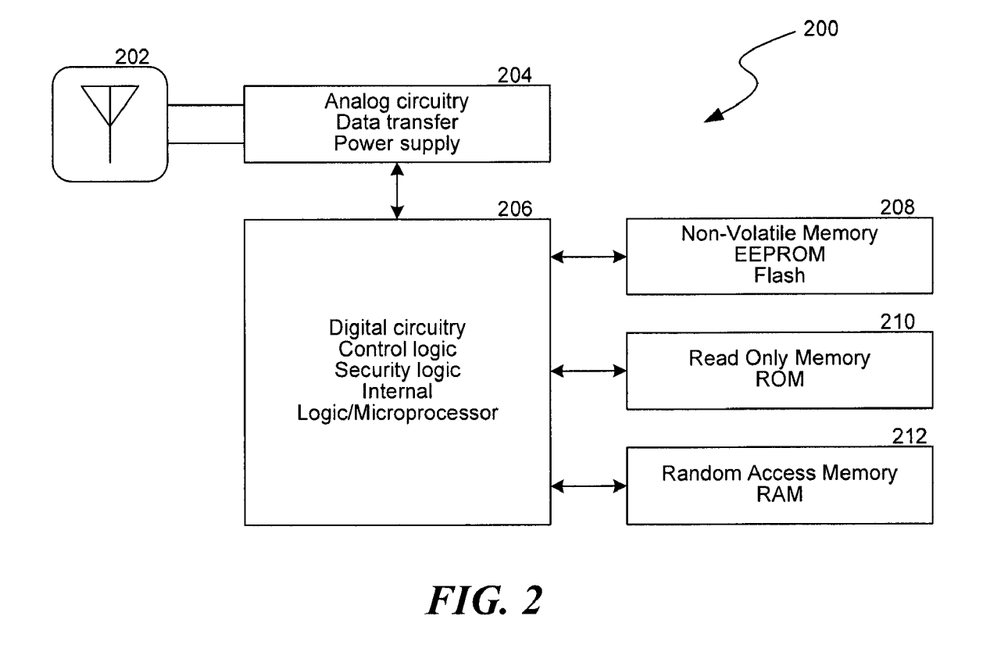
FIG. 2 illustrates a simplified block diagram of the hardware of an RFID tag for use in a tag management system.

The monitoring system can receive information from these various components. In one embodiment, the system is concerned with the identities or provenance of the tags, devices, and network appliances. Some tags and devices that may be counterfeit or unlicensed may fail to report some of the data that is requested upon interrogation. Based on the information that is derived (or not derived) from these components, various different actions can be taken by the monitoring system.

cuitry or the microprocessor in conjunction with software and data stored in the various forms of memory typically found in an RFID tag. The details of this RFID tag described herein are merely exemplary of the various tags which could be utilized with the systems and methods described herein.

A more detailed understanding of one embodiment can be achieved by reviewing the table below which illustrates a tag memory architecture suitable for use with the systems and methods described herein. As indicated in the table, certain bytes of tag data can be used to store a unique value, indicated as field name "Tag ID" in the table. In some embodiments, this value can be stored in bytes 0-7 and can represent the unique serial number (USN) discussed above. Tag data can also include tag manufacturer data, indicated as field name "Tag Manufacturer" in the table. In some embodiments, this value can be stored in bytes 8-9 and can represent a unique identification number assigned to the tag manufacturer (T-MID) as discussed above. As indicated in the table, tag data can also include device manufacturer data similar to the tag manufacturer data described above. As discussed in more detail below, this information and other information from the tag and inferred from tag data and device data can be used to track a tag as it is read by a reader or other device at any location in the world.

User data can be stored, in the embodiment illustrated by the table below, in bytes 29-127 (of course, more bytes can be provided for user payload data). In some embodiments, the user data is not polled, retrieved or otherwise accessed by a device when the device or network appliance is performing the authorization, security, authentication, clone detection or other methods discussed in detail herein. (User data may contain confidential information that may or may not be relevant to achieving the objectives of the invention described herein.) However, in some other embodiments, particularly those relevant to national security or border control, the user data may be polled by a reader and transmitted to the monitor for further analysis.

|  | Bytes | Field Name | Written | Locked |
|---|---|---|---|---|
| Tag Unique Serial No. | 0-7 | Tag ID | Mfg. | Mfg. |
| Memory Type and Size | 8-9 | Tag Manufacturer | Mfg. | Mfg. |
|  | 10, 11 | Tag Hardware Type | Mfg. | Mfg. |
| Tag Application and Data Presentation | 12-17 | Tag Memory Layout | Mfg. or Application | As required by Application |
| Device Unique Serial No. | 17-24 | Device ID | Mfg. | Mfg. |
| Memory Type and Size | 25-26 | Device Mfgr. | Mfg. | Mfg. |
| Device Application and Data Presentation | 27-28 | Device Hardware Type | Mfg. | Mfg. |
| User Data | 29-127 | User Data | Application | As required |

FIG. 2 illustrates the hardware of a representative RFID tag, generally designated 200, which is configured to perform the present invention. The tag 200 includes an RFID tag antenna 202 which receives signals from and transmits signals to a reader (not shown). RFID tag analog circuitry 204 provides for data transfer (and power supply in an active RFID tag). Digital circuitry 206 can be any type of digital circuitry, including dedicated logic devices, gate arrays, a microprocessor or other digital signal processing circuitry, together with any necessary software. RFID tag digital circuitry 206 provides the control logic and security logic for the RFID tag 200. RFID tag digital circuitry 206 communicates with RFID tag non-volatile memory (e.g., EEPROM/FLASH), RFID tag ROM 210, and RFID tag RAM 212. RFID tag functionality can be performed by the control logic circuitry Tag Management Depending on the environment, various combinations of tags and devices may be known or unknown to the system. The system will respond accordingly to these possibilities. Some of these combinations are described below.

Figure 3:
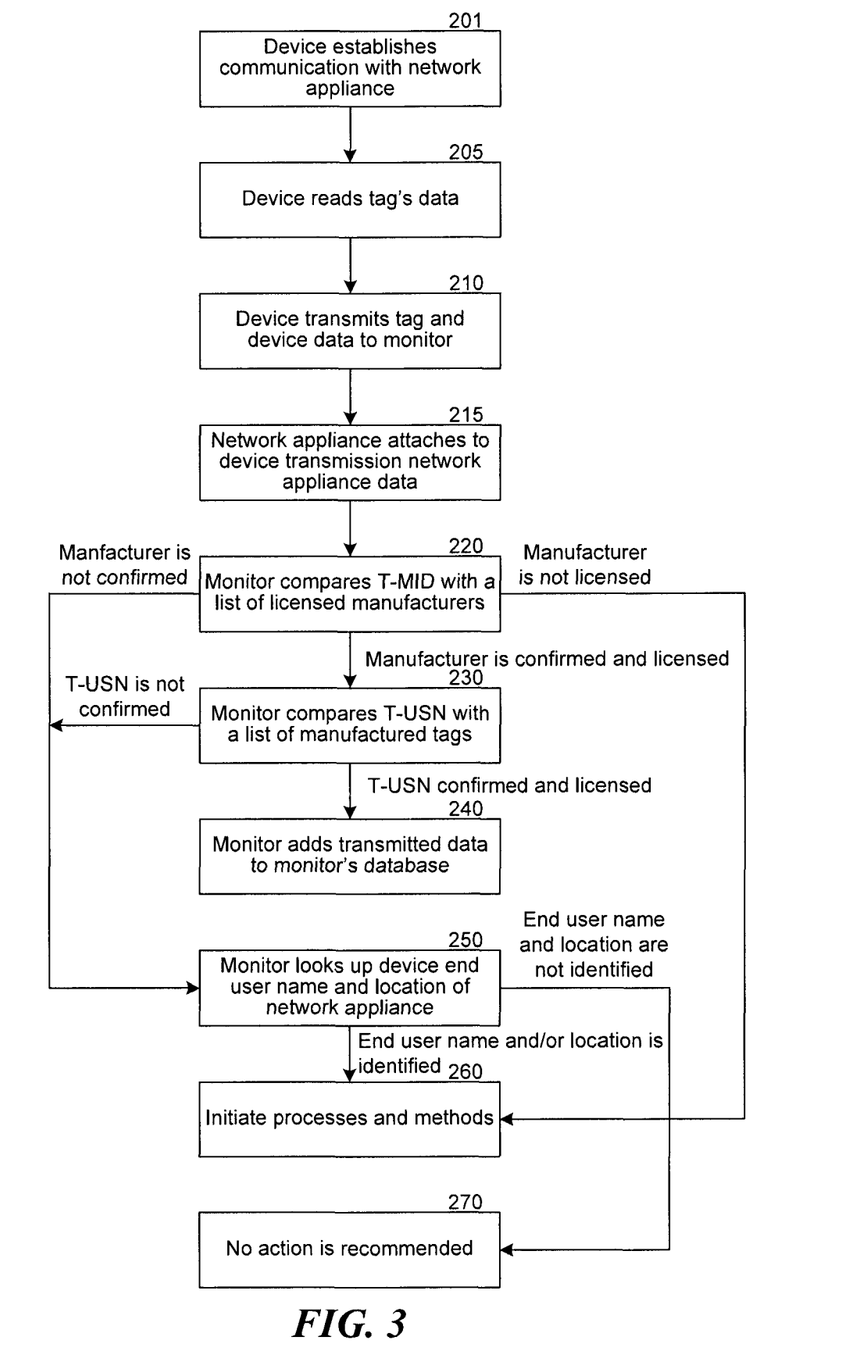
FIG. 3 illustrates a flow-diagram of tag management system.

As shown in the example of FIG. 3, once a device establishes communication with a network appliance in step 201, and the device reads tag data in step 205, a number of processes can be initiated based on the data received (or not received) from the tag being interrogated. In some cases, no action may be taken. In other cases, as illustrated in the figure, any one of various processes can be initiated.

Figure 4:
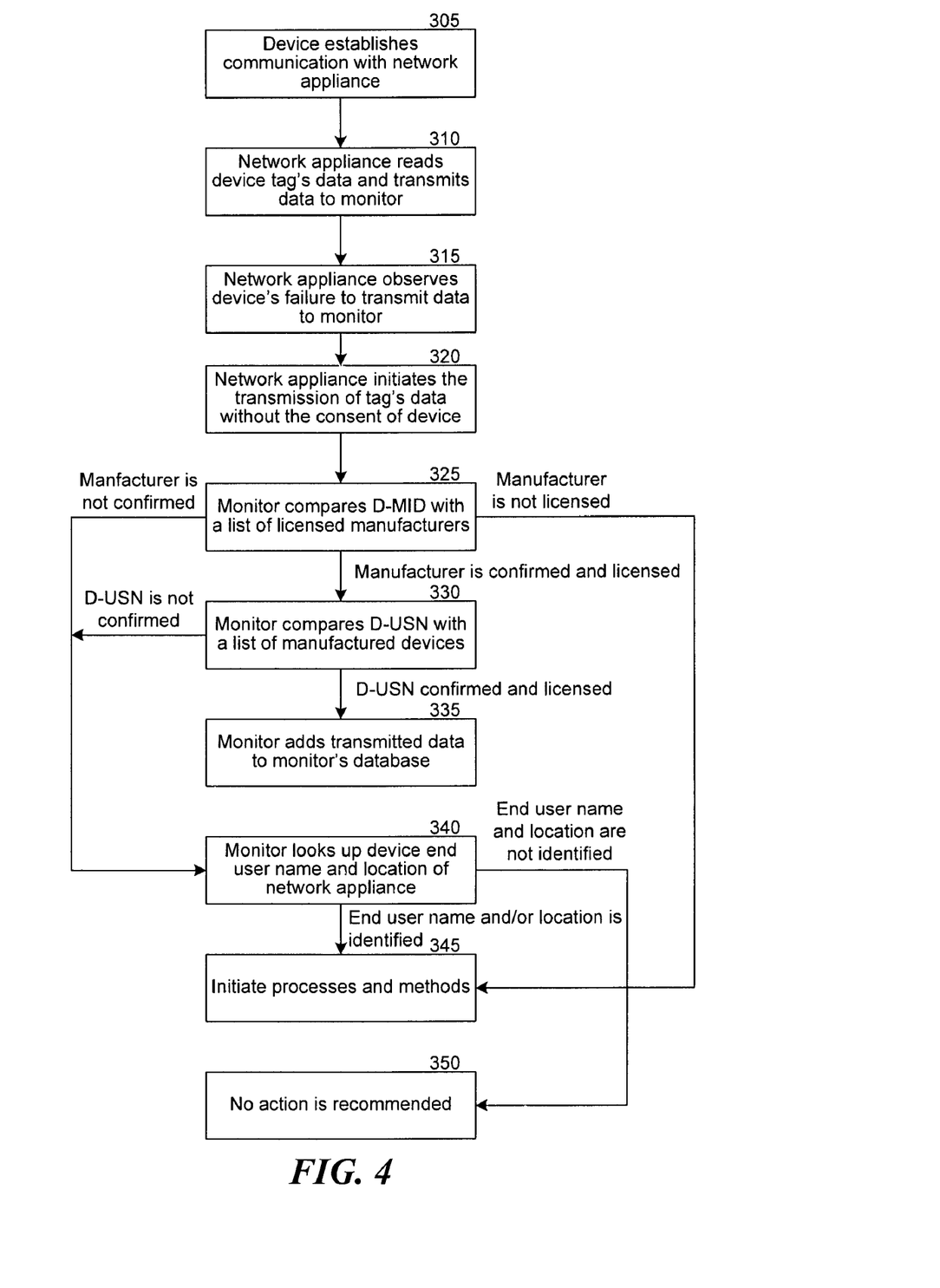
FIG. 4 illustrates a flow-diagram of a device management system.

FIGS. 3-4 are representative flow diagrams that depict processes used in some embodiments. These flow diagrams do not show all functions or exchanges of data, but instead they provide an understanding of commands and data exchanged under the system. Those skilled in the relevant art will recognize that some functions or exchange of commands and data may be repeated, varied, omitted, or supplemented, and other (less important) aspects not shown may be readily implemented.

1. Unknown Tag/Known Device

When a tag enters a monitored environment, a licensed device reads the tag in step 205. The device can automatically transmit the tag data and the device data to the monitor in step 210. A licensed network appliance can automatically add its network appliance data to this transmission to the monitor in step 215. Note that while much of the discussion herein involves licensed devices and licensed network appliances, unlicensed devices or appliances may also be used.

The monitor looks up the tag's T-MID number in a database containing the names and MID numbers of licensed tag manufacturers in step 220. If the T-MID number is not in the database or the monitor cannot access that information, the monitor will classify the tag as an "unknown tag." Classification of a tag as "unknown" can trigger further processing as described below in more detail.

The monitor looks up the device EID number in a database containing end user names and EID numbers in step 250. If the monitor is able to identify the end user, it can initiate, in step 260, a number of pre-programmed management processes and methods described in more detail below.

2. Unknown Tag/Unknown Device/Known Device Manufacturer

In addition to the steps described above, the monitor may look up the device EID number in a database containing end user names and EID numbers in step 250. If the monitor cannot find the device EID number in the database or is not allowed to access that information, the monitor will classify the device as an "unknown device." Classification of a device as "unknown" can trigger further processing as described below in more detail.

The monitor looks up the D-MID number in a database containing device manufacturers' names and MID numbers. If the monitor is able to identify the device manufacturer, it can initiate a number pre-programmed management processes and methods described in more detail below.

3. Unknown Tag/Unknown Device/Unknown Device Manufacturer/Known Network Appliance The monitor looks up the device EID number in a database containing end user names and EID numbers in step 250. If the monitor cannot find the device EID number in the database or is not allowed to access that information, the monitor will look up the network device manufacturers in a database containing the names and MID numbers of network device manufacturers.

The monitor looks up the N-MID number in a database containing network device manufacturers' names and MID numbers. If the monitor is able to identify the network device manufacturer, it can initiate a number of pre-programmed management processes and methods described in more detail below.

4. Unknown Tag/Unknown Device/Unknown Device Manufacturer/Unknown Network Appliance Manufacturer In addition to the steps described above, the monitor may look up the D-MID number in a database containing device manufacturers' names and MID numbers. If the monitor is unable to identify the device manufacturer, the monitor looks up the N-MID number in a database containing manufacturers' names and MID numbers. If the monitor is unable to identify the network device manufacturer, it stores the tag data, device data and network appliance data and waits until the same tag is reported by a known device or a known network appliance at which point, the monitor can initiate a number pre-programmed management processes and methods described in more detail below.

5. Cloned Tags

In addition to the steps described above, the monitor may search an RFID surveillance database for other instances in which the tag's USN was transmitted by a device. After collecting multiple instances of the tag's USN in the RFID surveillance database, the monitor can perform various tests to determine whether the tag involved in the most recent report may be a clone of another tag. Non-limiting examples of the clone detection tests the monitor can use are:

A) Simultaneous or near simultaneous reports of the tag's presence by devices operated by two or more end users (e.g., based on the date and time of each report);

B) Improbably short time between the most recent report and the next most recent report of the tag's presence by devices operated by two or more end users (e.g., based on statistical analysis of the elapsed time between multiple reports of the identical tags by devices operated by multiple end users using data in the RFID surveillance database);

C) Improbable end user (e.g., based on statistical analysis of correlations between multiple end users reporting identical tags using data in the RFID surveillance database); and D) Correlations between two or more clone detection tests (e.g. based on statistical analysis of correlations between clone detection tests using the confirmed clone data in the RFID surveillance database).

If the clone detection tests suggest that the most recently reported tag is a clone of another tag, the monitor will classify the tag as a "potential clone" and will use the tag EID number, the device EID number or the network appliance EID number to identify the manufacturer of the tag, device or network appliance.

Once the tag, device or network appliance manufacturer has been identified, the monitor can initiate a number pre-programmed management processes and methods described in more detail below.

If the monitor is unable to identify the end user, the device manufacturer or the network appliance manufacturer, it stores the tag data, device data and network appliance data and waits until the same tag is reported by a known device or a known network appliance, at which point the monitor can initiate a number of processes and methods as described in more detail below.

Additional methods for detecting possibly cloned tags include:

A) An improbably long time between reports of the tag's presence by devices operated by two or more end users (e.g., based on statistical analysis of the elapsed time between multiple reports of identical tags by devices operated by multiple end users using data in the RFID surveillance database); and B) An improbably long time between reports of the tag's presence by two or more devices operated by the same end user (e.g., based on statistical analysis of elapsed time between multiple reports of identical tags by devices operated by a single end user using data in the RFID surveillance database).

6. Transferred Tags

The monitor looks up the tag's T-MID number in a database containing the names and MID numbers of licensed tag manufacturers in step 220. If the monitor determines that the tag is licensed, it classifies the tag as a "known tag" and takes no action except to store the tag data, device data and network appliance data.

Subsequently, an end user can use its own databases to determine that the actual contents of the container or the package associated with the known tag are not the contents that are supposed to be in the container or package and can optionally report the mismatch to the monitor.

Using the mismatch reports and other data collected from reporting devices and network appliances, the monitor can initiate a number of processes and methods as described in more detail below.

Device Management

Depending on the environment, various combinations of devices may be known or unknown. The system will respond according to these possibilities. Some of these combinations are described below.

As shown in FIG. 4, once device tag data is received by a network appliance, a number of processes can be initiated based on the data received (or not received) from the device being interrogated. In some cases, no action may be taken. In other cases, as illustrated in the figure, any one of various processes can be initiated.

1. Non-Compliant Devices/Known Device Manufacturer/Known End User

As a device enters a monitored environment, the device establishes communication with a licensed network appliance in step 305. The licensed network appliance reads the device tag and collects and stores the device data in step 310. Afterwards, the network appliance monitors the device's tag transmissions in step 315.

If the network appliance determines that the device failed to transmit the tag data to the monitor shortly before or shortly after transmission of the tag data and its own device data to a destination other than the monitor—e.g., instead of two transmissions of tag data per read (one to the monitor and one elsewhere), there is only one transmission of tag data per read (to a destination other than the monitor)—the network appliance classifies the device as a "non-compliant device."

On the next occasion when the non-compliant device transmits tag data to a destination other than the monitor without transmitting that tag data and the device data to the monitor ("second non-compliant read"), the network appliance automatically stores the tag data from the second non-compliant read and transmits it to the monitor along with the device data and its own network appliance data in step 320.

At this point, the monitor looks up the device's D-MID number in a database with D-MID numbers and associated names of device manufacturers and looks up the device's EID number in a database with EID numbers and associated names of end users in step 325.

If the monitor is able to identify the device manufacturer and/or the associated end user, that information and the tag data allows the monitor to initiate a number pre-programmed management processes and methods described in more detail below.

2. Non-Compliant Device/Unknown Device Manufacturer/Known End User

After step 320, the monitor looks up the non-compliant device's D-MID number in a database with D-MID numbers and associated names of device manufacturers, looks up the device's EID number in a database with EID numbers and associated names of end users, and looks up the network appliance D-MID number and EID number in database(s) containing network appliance D-MID numbers and EID numbers and associated names of network appliance manufacturers and end users.

If the monitor is unable to identify the manufacturer of the non-compliant device, but is able to identify the associated end user, based on the information available, the monitor can initiate a number pre-programmed management processes and methods described in more detail below.

3. Non-Compliant Device/Unknown Device Manufacturer/Unknown End User/Known Network Appliance In addition to the steps described immediately above, if the monitor is unable to identify the manufacturer of the non-compliant device or the device end user, the monitor tries to identify the network appliance manufacturer and associated end user.

If the monitor is able to identify the network appliance manufacturer or associated end user, it can initiate a number pre-programmed management processes and methods described in more detail below.

4. Non-Compliant Device/Unknown Device Manufacturer/Unknown End User/Unknown Network Appliance/Known Tag In addition to the steps described immediately above, if the monitor is unable to identify the device manufacturer, network appliance manufacturer or associated end user(s), it tries to identify the second-read tag, the tag manufacturer and the associated end user.

If the monitor is able to identify the second-read tag, the tag manufacturer or the associated end user, it can initiate a number pre-programmed management processes and methods described in more detail below.

5. Non-Compliant Device/Unknown Device Manufacturer/Unknown End User/Unknown Network Appliance/Unknown Tag In addition to the steps described above, if the monitor is unable to identify the manufacturer of the non-compliant device or the device end user, the monitor tries to identify the network appliance manufacturer and associated end user.

If the monitor is unable to identify the device manufacturer, network appliance manufacturer or associated end user(s), it tries to identify the second-read tag, the tag manufacturer and the associated end user.

If the monitor is unable to identify the second-read tag, the tag manufacturer or the associated end user, it stores the device data, network appliance data and tag data until the presence of the same tag is reported by a licensed device or network appliance. At that point, the monitor can initiate a number pre-programmed management processes and methods described in more detail below.

Overall, for this example 5 and other examples provided herein, a threshold number may need to be reached before the system automatically begins one of the processes described below. For example, the system may gather evidence of possible counterfeit tags, automatically generate a report, and perform other actions only after the number of related counterfeit tags is more than 500.

Other Management Processes and Methods

With reference to FIG. 1, monitoring system 120 can receive aggregated data from tags 105 as well as MAC and/or IP addresses from network appliances 115 and devices 110, or other devices coupled directly or indirectly to network 117. Once information concerning one or more tags or devices has been transmitted to the monitoring system, the monitoring system can perform a range of other management process and methods.

Figure 5:
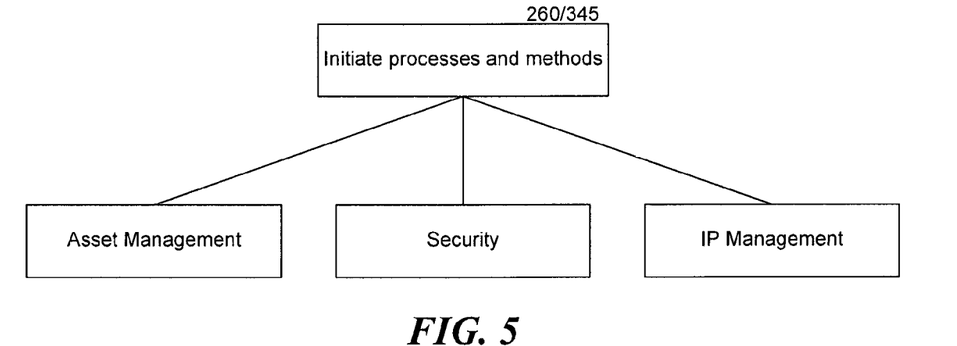
FIG. 5 illustrates a flow-diagram of other management processes and methods.

As illustrated in the non-limiting example of FIG. 5, these processes can relate to security, asset management, and intellectual property management. One skilled in the art will understand that many other management processes and methods can be initiated using the invention described herein. At least some of these management processes and methods can be based at least in part on the statistical methods described in more detail below.

1. Security

Examples of security features relevant to shipment interdiction and national security are discussed in more detail below.

Unknown/Unauthorized Tag

An unknown/unauthorized tag may arrive in a customs area for export. Data compiled by the monitor is used to notify and/or warn the receiving customs agency of the "intruder" and trigger a "track and trace" routine so that the receiving customs agency can examine the shipment, locate the shippers and take corrective action.

An unknown/unauthorized tag may arrive in a customs area for export. Data compiled by the monitor is used to notify and/or warn a destination customs agency of the rogue shipment destined for its location. This information may be used to stop shipment or to flag the shipment for segregation/examination, export hold, import hold, and/or recipient notification on arrival at the destination customs agency.

Notification/warning to public/private security/safety agencies could be triggered in addition to other notifications/warnings. If an unknown/unauthorized tag arrives at a destination customs agency with no warning, the unknown/unauthorized status of the tag can be used to flag the shipment for segregation/examination at the receiving location.

Shipment Interdiction

A mismatch may occur between an expected bill of lading and an actual bill of lading. Expectations as to the contents of a shipment may have been set by tag data or by other automatic or manual means. Segregation, examination, port hold, import hold, recipient notification or some or all of these may be triggered by the mismatch.

Notification/warnings can be generated for public safety agencies and similar private entities. For example, an intruder detection monitor device can be used to detect an unknown/unauthorized tag. Tag data and end user data and network appliance data is reported to the end user who can use a "track and trace" routine to locate the unknown/unauthorized tag.

End-User Security

The system described herein can be used for shipment interdiction, track and trace, legal or other action against counterfeiters and diverters. As discussed above in the import context, mismatch detection can operate to determine a discrepancy between actual and expected contents of objects associated with a tag.

The system can be configured to perform clone detection. Data concerning potential clones can be used to track, trace, inspect, and remove unauthorized goods from their environments and to take legal and or other action against counterfeiters.

2. Asset Management

As non-limiting examples, tag and device management can be used in connection with maintaining inventories, identifying and tracking equipment status (active, partially active, totally inactive), missing equipment (what a user should have received but cannot locate), recalls, replacements (equipment that replaces equipment that is end-of-life, decertified, recalled, partially inactive, or totally inactive), and status assessment of authorized equipment (certified, recalled, active, partially inactive, totally inactive).

The monitoring system can also be used in counterfeit detection and diversion detection as discussed in more detail herein.

Inventories

The system can be used to prepare shrink reports. Tag data compiled by the monitor can be used to determine what goods should be in a facility at a particular time. Entries into the environment can be matched with exits from the environment and expected inventory information. When an inventory tag reading is performed, the tags in the environment (actual inventory) can be compared to the expected inventory data.

Data concerning the tags that were on the expected inventory list but are not on the actual inventory list can be used to notify the end user of shrink, initiate a track and trace routine to confirm the presence or absence of the goods or improve security, calculate the value of the missing items for accounting purposes, initiate replenishment orders, and initiate insurance claims.

The system can be used for transaction support (as tags move in and out of a manifested environment) the tag data, device data, and data/time of entry/exit can be used to notify a supplier that title to goods has transferred to the customer and trigger invoicing and revenue recognition (e.g., goods moved from a vendor's warehouse to a customer's facility or from one area of the vendor's warehouse to a bonded area of the warehouse for goods whose title has been transferred from the vendor to the customer).

Missing equipment can be monitored in a way similar to that of inventories. The system can also be used to monitor equipment being recalled due to defect, end of life, certification issues, performance problems, service requirements, required maintenance, upgrades, etc. Data compiled by the monitor can be used to track and trace the equipment in question.

Track and Trace

Data compiled by the monitor (data relating to the date/time of entry/exit, network appliance data, device data, tag data, end user data, manufacturer data, etc.) can be used to:

A) Pinpoint the present location of a tag or device;
B) Determine the path followed by the tag or device (within or across enterprises) from first read to last read;
C) Flag for investigation and process improvement situations in which tag or device transit time between locations is excessive;
D) Flag for investigation "improbable end user" situations that may indicate an infringing end user or a cloned tag or an unauthorized tag transfer tag or infringing device;
E) Determine the "last read" location of missing goods so that a search/investigation can begin;
F) Flag for investigation based on an improbable first read; or
G) Identify an improbable first read in a situation in which logic or probability suggests that the tag should have appeared in a monitored environment before the first read. For example, if the first read occurs during unload at a U.S. customs facility when logic or regulations say suggest or dictate that the first read should have occurred upon entry to or exit from the customs agency in the country where the shipment originated. As a specific example, a first read may occur in Kansas City when statistical analysis of the end user's tag activity suggests this end user usually ships its products to Kansas City via another city.

3. Intellectual Property Management

Figure 6:
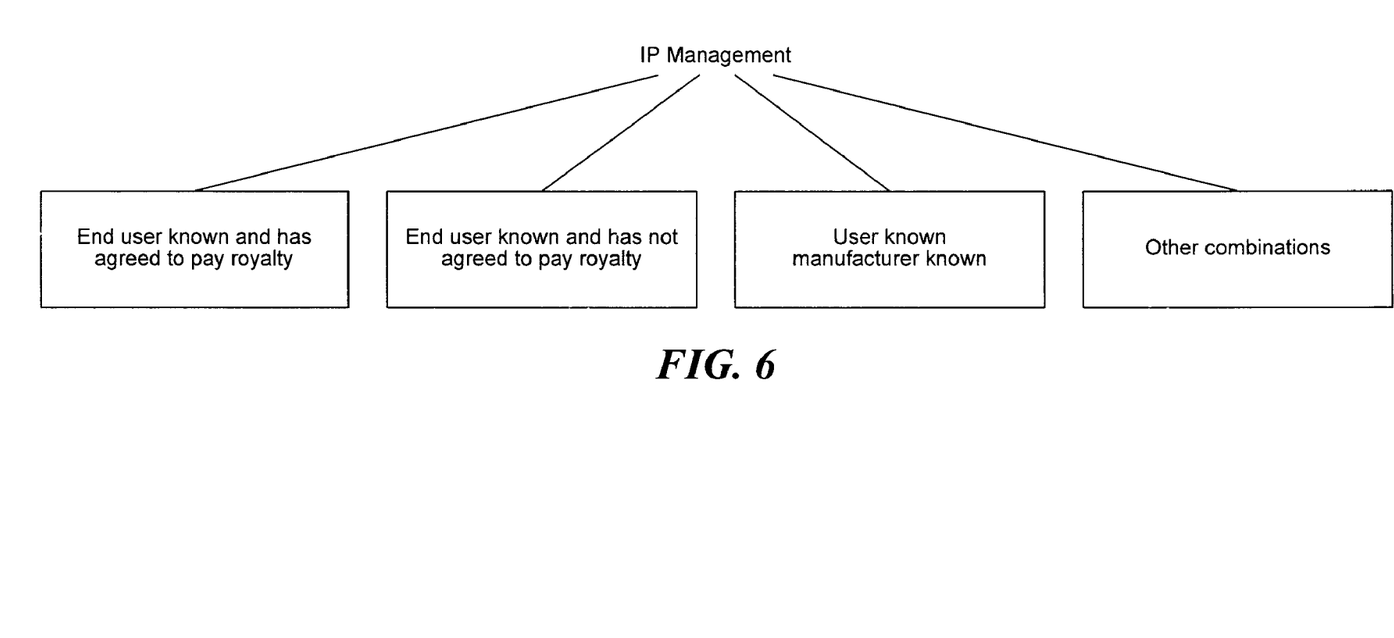
FIG. 6 illustrates a flow-diagram for intellectual property management processes and methods.

As illustrated in FIG. 6, the systems and methods described herein can be used to perform a wide range of intellectual property management processes and methods related to intellectual property management. The monitoring system can be used to manage intellectual property rights in tags, readers, and network appliances together or separately. In some embodiments, management can be based on the results of the statistical analysis described in more detail below. In general, actions taken and conclusions made based on collected tag data can be based on whether or not the purported user's identity is known and whether that user (if known) is licensed to use the corresponding intellectual property.

Some possible scenarios and corresponding management processes and methods are described below.

(A) If the end user is known and has agreed to pay a royalty for the right to use tags, devices and/or network appliances that have not been licensed by the intellectual property owner, then:
1. The monitor will be able to provide a report to the intellectual property owner which identifies an end user using unlicensed tags, devices or network appliances associated with that end user.
2. The intellectual property owner can use the monitor's report to calculate the royalty due from the end user for the unlicensed tags, devices or network appliances used by that end user (the "royalty for unlicensed equipment").
3. The monitor's report can be transmitted automatically to the end user in a fashion that automatically triggers the end user's process for paying the royalty for unlicensed equipment.

(B) If the end user is known but has not agreed to pay a royalty for the right to use tags, devices and/or network appliances that have not been licensed by the intellectual property owner, then:
1. The monitor will be able to provide a report to the intellectual property owner which identifies an end user using unlicensed tags, devices or network appliances associate with that end user.
2. The intellectual property owner can use the monitor's report to calculate the royalty due from the end user for the unlicensed tags, devices or network appliances used by that end user (the "royalty for unlicensed equipment"). The intellectual property owner can also use the monitor's report in litigation to compel end users to pay the unlicensed equipment royalty.
3. If the intellectual property owner does not want to pursue the end user, it can obtain from the monitor a report that identifies the manufacturer of the unlicensed tag, device or network appliance. The monitor's report can be used by the intellectual property owner to preclude infringers from using the intellectual property or collecting royalties by threatening to sue or filing suit against the manufacturer of the unlicensed tag, device or network appliance.

(C) If the end user is unknown but the manufacturer of the tag, device or network appliance is known, other analogous steps including those described above can be taken.

(D) If the tag, tag manufacturer and associated end users are unknown but the manufacturer of the device or network appliance and associated end users are known, other analogous steps including those described above can be taken.

(E) If the tag manufacturer, device manufacturer and associated end users are unknown but the network appliance manufacturer and associated end user are known, other analogous steps including those described above can be taken.

(F) If the tag manufacturer, device manufacturer and network appliance manufacturer and associated end users are unknown, other analogous steps including those described above can be taken.

Unlicensed Tags—Shipment Interdiction

An intellectual property owner may have registered its patent(s) with customs officials. Unknown tag data compiled by the monitor in combination with network application data is used to identify unlicensed tags located in customs holding areas. Unknown tag data is given to customs officials (preferably via automatic means but not necessarily). Customs officials use the unknown tag data to identify the unknown tag(s) in the customs holding area. Customs officials can prevent the unknown tags and the attached containers, packages and/or goods from being imported into the country.

Unlicensed Tags—Infringing Tag Manufacture

Unknown tag data and known tag manufacturer data and network appliance data compiled by the monitor is used to identify infringing tag manufacturers. The intellectual property owner can use this data to obtain an enforceable order (through litigation or other means) to stop the infringing manufacturer's manufacture/sale of the infringing tags or to pay the intellectual property owner for the right to manufacture or sell the tags.

Unlicensed Tags—Infringing End-User

Unknown tag data, known end user data, and network appliance data are compiled by the monitor and are used to identify end-users that are using infringing tags. The intellectual property owner can use this data to stop (through litigation or other means) the end user from using the infringing tags or to compel the end user to pay the intellectual property owner for the right to use the tags. The intellectual property owner can also use this data to manage innovative royalty systems—e.g., metering.

The intellectual property owner could establish a schedule of per-tag royalty rates for the use of unlicensed tags in which the end user pays a rate of x per tag for the first 10,000 infringing tags used by the end user; a rate of x+y or x−y for the use of the next 10,000 unlicensed tags; and so on. The rate schedule can increase or decrease with greater usage depending on the intellectual property owner's objective. If the intellectual property owner wishes to discourage use of unlicensed tags, the rate would escalate as the number of unlicensed tags increases. If the intellectual property owner wishes to encourage use of unlicensed tags, the rate would decrease as the number of unlicensed tags decreases. If the intellectual property owner is neutral on the use of unlicensed tags, the rate would remain the same as use of unlicensed tags increases. Combinations of these approaches can also be used to encourage or at least not discourage use of unlicensed tags up to a point and then increase or decrease the rate above the threshold depending on the intellectual property owner's goal. In all of these cases, the unknown tag data and known end user data and the network appliance data is used to calculate the royalty due from the end user for its use of infringing tags and to prove that the infringing tags were, in fact, used by the end user.

In some embodiments, the "per tag" rate could be replaced by a flat rate for a given number of tags—whether licensed or not. In some embodiments, the intellectual property owner could also use this data to calculate a royalty based on the degree or intensity of an end user's reliance on RFID by using the number of reads of licensed or unlicensed tags. The rate could be selected to encourage or discourage usage.

Licensed Tag and Known End-User Data

Known tag data and known end user data and network appliance data can be used by the intellectual property owner to manage a royalty "metering" system. In some embodiments, the "per tag" rate or flat rate for licensed tags would be different than (and possibly lower than) the rate for unlicensed tags.

Unlicensed Devices and Known Device Manufacture

Unknown device data and known manufacturer data and network appliance data are used to identify an infringing device manufacturer. An intellectual property owner can use this data to compel (by litigation or other means) the device manufacturer to stop infringing or pay for the privilege of continuing to practice the invention.

Unlicensed Device and Known End-User

Unknown device data and known end user data and network appliance data can be used to identify an infringing end user. Tag data concerning potential clones can be used by the intellectual property owner to compel (by litigation or other means) infringing tag manufacturers and end-users to cease practicing the invention or to pay for the right to continue to practice the invention.

Unlicensed Tag, Unlicensed Device, Unknown End User, Known Network Appliance Manufacturer Network appliance data can be used to identify the end user. An intellectual property owner can compel (by litigation or otherwise) an end user to stop use of infringing devices and tags or to require an end user to pay for such use. A payment system could be per tag, per device, per read or some combination thereof. The payment system could vary depending on the number of tags, devices or reads. An initial report can include all unknown tags and/or devices, and subsequent reports can include unknown tag and unknown tag manufacturer and known device, device manufacturer, end user, and/or network appliance data.

A second report can trigger a "track and trace" routine, such as that described above. An intellectual property owner can use results of "track and trace" to stop infringers from practicing patents (via litigation or otherwise), to require infringers to pay for use, or both. An infringer could be a tag manufacturer, a device manufacturer, and/or an end user.

In addition to use for monitoring unlicensed tags and devices, the monitoring system can be used to collect data relating to content mismatches. End users can maintain databases that associate the tag on a container, package or item with the unique identification numbers of the contents of that container, package or item. The end user reports to the monitor instances in which there is a mismatch between the expected contents and the actual contents of a container or package bearing an RFID tag. The monitor collects and stores in the RFID surveillance database data on reported mismatches.

Statistical Analysis

In some embodiments, the determination as to whether a device or tag is unlicensed or counterfeit can be based on a statistical analysis of aggregated data. For example, if a substantial number of RFID tags having identical identifiers are found to have been scanned in a short period of time, there is a significant chance that these tags are counterfeited. Two factors in forming such a determination are the number of identical identifiers and the time period within which the identical identifiers were detected. As the time period within which they are detected shortens, the chances that the tags are counterfeit increases. Further, as the number of identical tags detected within a given period of time increases, the chances that the tags are counterfeit increases. Thus, the monitoring system can aggregate tag data and analyze that data according to certain time periods and certain threshold values for the number of identical identifiers.

In some embodiments, the monitoring system can also include tag or device location as a factor in the statistical analysis. Tag data and device data that are passed through a network, such as the Internet, may be traced to their logical and/or physical origins or a location near its logical and/or physical origins. Certain logical and/or physical locations may be associated with corresponding threshold values. As an example, a certain geographic area may be known to have a large number of counterfeits, and the monitoring system can be configured such that, for tag or device data obtained from such areas, a lower threshold needs to be satisfied for a shorter period of time to identify counterfeit activity.

In some embodiments, the time periods and threshold values can be dynamically determined based on historical information available to the monitoring system. In other embodiments, the time periods and threshold values can be preprogrammed.

The results of the statistical analysis as well as the raw data collected at the monitoring system can be gathered as evidence. The evidence can ultimately be used in a court of law or presented by an intellectual property owner to customs officials or other governmental entities in connection with an enforcement action.

CONCLUSION

Many specific details of certain embodiments of the invention are set forth in the description and in FIGS. 1-6 to provide a thorough understanding of these embodiments. A person skilled in the art, however, will understand that the invention may be practiced without several of these details and that additional details can be added to the invention. Well-known structures and functions have not been shown or described in detail to avoid unnecessarily obscuring the description of the embodiments of the invention. As used herein, one or more components "coupled" to each other can be coupled directly (i.e., no other components are between the coupled components) or indirectly (i.e., one or more other components can be placed between the coupled components).

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above detailed description of embodiments of the invention is not intended to be exhaustive or to limit the invention to the precise form disclosed above. While specific embodiments of, and examples for, the invention are described above for illustrative purposes, various equivalent modifications are possible within the scope of the invention, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed in parallel, or may be performed at different times.

The teachings of the invention provided herein can be applied to other systems, not necessarily the system described above. The elements and acts of the various embodiments described above can be combined or altered to provide further embodiments.

These and other changes can be made to the invention in light of the above Detailed Description. While the above description describes certain embodiments of the invention, and describes the best mode contemplated, no matter how detailed the above appears in text, the invention can be practiced in many ways. Details of the system may vary considerably in its implementation details, while still being encompassed by the invention disclosed herein.

The terminology used in the Detailed Description is intended to be interpreted in its broadest reasonable manner, even though it is being used in conjunction with a detailed description of certain specific embodiments of the invention. Certain terms may even be emphasized; however, any terminology intended to be interpreted in any restricted manner will be overtly and specifically defined as such in this Detailed Description section. In general, the terms used in the following claims should not be construed to limit the invention to the specific embodiments disclosed in the specification, unless the above Detailed Description section explicitly defines such terms. Accordingly, the actual scope of the invention encompasses not only the disclosed embodiments, but also all equivalent ways of practicing or implementing the invention under the claims.

While certain aspects of the invention are presented below in certain claim forms, the inventors contemplate the various aspects of the invention in any number of claim forms. For example, while only one aspect of the invention is recited as a means-plus-function claim under 35 U.S.C sec. 112, other aspects may likewise be embodied as a means-plus-function claim. Accordingly, the inventors reserve the right to add additional claims after filing the application to pursue such additional claim forms for other aspects of the invention.

I claim:

1. A radio frequency identification (RFID) tag monitoring system for tracking multiple RFID tags as they are used, the system comprising:
    a radio frequency reader for collecting data from at least one RFID tag associated with an item, wherein the radio frequency reader comprises:
        a radio;
        a memory for storing instructions; and
        a processor for processing the stored instructions;
        wherein the stored instructions configure the radio frequency reader to:
            transmit a signal from the radio frequency reader to the RFID tag;
            receive by the radio frequency reader a reply signal from the RFID tag, wherein the reply signal includes at least one RFID tag record pertaining to an identity of the RFID tag and directly or indirectly to an identify of a manufacturer and/or owner of the RFID tag;
            provide location and/or time data associated with a location of the radio frequency reader, or associated with a time and date of receiving the RFID tag record;
            transmit from the radio frequency reader, by wireless or wired means, the RFID tag record and the location and/or time data related to the associated location or time and date;
    a computing device that comprises:
        computer memory for storing computer instructions;
        an RFID tag database comprising a list of authorized RFID tags that have been licensed by an intellectual property owner or licensee; and,
        at least one computer processor coupled to the computer memory and to the RFID tag database, and configured to receive the transmitted the RFID tag record and the location and/or time data related to the associated location or time and date;
        wherein the stored computer instructions configure the computing device to:
            compare the RFID tag record with the list of authorized RFID tags;
            analyzed the location and/or time data related to the associated location or time and date, wherein the analyzing includes reviewing data from previously reported RFID tags; and,
            determine whether the RFID tag is authorized by a rights holder based at least in part on the comparing and the analyzing.

2. The system of claim 1 further comprising:
    determining based on the current location data and on previous location data whether the RFID tag has been cloned or duplicated.

3. The system of claim 1 wherein the RFID tag record comprises a serial number of the RFID tag that only indirectly identifies the manufacturer of the RFID tag, but the RFID tag database directly identifies the manufacturer of the RFID tag based on the serial number.

4. The system of claim 1 wherein the stored computer instructions further configure the computing device to calculate or estimate an amount of compensation due for a manufacture or a sale of the RFID tag based at least in part on the RFID tag record.

5. The system of claim 1 wherein the RFID tag record comprises a serial number of the RFID tag that only indirectly identifies the owner of the RFID tag, but the RFID tag database directly identifies the owner of the RFID tag based on the serial number.

6. The system of claim 1 wherein the stored computer instructions further configure the computing device to calculate or estimate an amount of compensation due for a use of the RFID tag based at least in part on the RFID tag record.

7. The system of claim 1 wherein the stored computer instructions further configure the computing device to select the RFID tag or a group of RFID tags for inspection, segregation or destruction based at least in part on the RFID tag record and the location and/or time data related to the associated location or time and date.

8. The system of claim 1 wherein the stored computer instructions further configure the computing device to select the RFID tag or a group of RFID tags for inspection, segregation or destruction as potentially counterfeit based at least in part on data identifying current and previous locations of the RFID tag.

9. The system of claim 1 wherein the stored computer instructions further configure the computing device to identify the RFID tag or a group of RFID tags as at least potentially counterfeit based on data of the time and date of receiving the RFID tag record alone or in combination with other data.

10. A method of operating a wireless surveillance system having a radio frequency reader for collecting data from a wireless memory device associated with an item and at least one data object identifying the wireless memory device, the method comprising:
    at a computer device, receiving from the radio frequency reader at least one data object pertaining to an identity of the wireless memory device, wherein the at least one data object pertaining to the identity of the wireless memory device is provided to the wireless memory device by the wireless memory device;

at the computer device, comparing the at least one data object pertaining to the identity of the wireless memory device with a list of data objects of wireless memory devices that have been licensed by an intellectual property owner or a licensee of the intellectual property owner, wherein the intellectual property owner owns intellectual property associated with technology in or used by the wireless memory device; and, determining whether the wireless memory device is a licensed wireless memory device based on the comparing.

11. The method of claim 10 wherein the data object pertaining to the identity of the wireless memory device is used alone or in combination with other data to identify a manufacturer of the wireless memory device.

12. The method of claim 10 wherein the data object pertaining to the identity of the wireless memory device is used alone or in combination with other data to automatically calculate or estimate amount of compensation due for manufacture or sale of the wireless memory device.

13. The method of claim 10 wherein the data object pertaining to the identity of the wireless memory device is used alone or in combination with other data to identify an owner of the wireless memory device.

14. The method of claim 10 wherein the data object pertaining to the identity of the wireless memory device is used alone or in combination with other data to calculate or estimate amount of compensation due for the use of the wireless memory device.

15. The method of claim 10 wherein the wireless memory device is a radio frequency tag, insert, or chip.

16. A computer-readable medium storing or encoding instructions that when implemented on a computer perform a method to determine authenticity of a wireless memory device read by a radio frequency reader that collects data from the wireless memory device, the method comprising:

receiving, directly or indirectly from the wireless memory device, a signal having at least one data object associated with an origin or identity of the wireless memory device;

associating additional data with the at least one data object associated with the wireless memory device, wherein the additional data comprises evidence of wireless memory device usage;

comparing the data object associated with the wireless memory device with data of authorized wireless memory devices;

analyzing the evidence of wireless memory device usage with data of wireless memory devices that already have been previously reported; and determining whether the wireless memory device is an authorized wireless memory device based at least in part on the comparing and the analyzing.

17. The computer-readable medium of claim 16 further comprising:

determining whether a location of the wireless memory device is similar to a location of previously reported wireless memory devices.

18. The computer-readable medium of claim 16, wherein the evidence of wireless memory device usage comprises a location of the wireless memory device based on a location of the radio frequency reader that provided the signal or a fixed network appliance that provided the signal and that was in wireless communications with the radio frequency reader.

19. The computer-readable medium of claim 16, wherein the evidence of wireless memory device usage comprises a time and date related to receipt of the at least one data object associated with the wireless memory device.

20. The computer-readable medium of claim 16, further comprising determining whether a location of the wireless memory device is similar to a location of previously reported wireless memory devices under a statistical analysis of aggregated device usage data.

21. The computer-readable medium of claim 16, wherein the radio frequency reader comprises an associated wireless memory device, the associated wireless memory device storing data uniquely identifying the radio frequency reader to the computer.

22. The computer-readable medium of claim 16 wherein the wireless memory device is a radio frequency tag, radio frequency insert, or radio frequency chip.

23. An apparatus for operating a wireless surveillance system having a wireless radio frequency reader for collecting data from a wireless memory device and an access point associated with the wireless radio frequency reader, the method comprising:

means for receiving, over a computer or telecommunications network, at least one data object pertaining to an identity of the reader, to an identity of the wireless memory device, or both;

means, coupled to the means for receiving, for respectively comparing the data object pertaining to the identity of the reader, to an identity of the wireless memory device, or both, with a list of data objects of wireless radio frequency readers that have been licensed by an intellectual property owner or licensee, a list of data objects of wireless memory devices that have been licensed by an intellectual property owner or licensee, or both; and means, coupled to the means for comparing, for determining whether the wireless radio frequency reader is a licensed wireless memory device, the wireless memory device is a licensed wireless memory device, or both.

24. The apparatus of claim 23 wherein the means for determining comprises means for employing statistical analysis to determine whether the wireless radio frequency reader is a licensed wireless memory device, the wireless memory device is a licensed wireless memory device, or both.

25. The apparatus of claim 23 wherein the means for determining comprises means for establishing whether a threshold number of potential unlicensed wireless memory devices or unlicensed wireless memory devices have been detected before implementing further action.

26. The apparatus of claim 23 wherein the data object is used alone or in combination with other data to identify an owner or manufacturer of the wireless memory device or wireless memory device, and wherein the data object is used alone or in combination with other data to calculate or estimate an amount of compensation due for the use or manufacture of the wireless memory device or wireless memory device.

27. A wireless memory apparatus for use in a wireless surveillance system, wherein the wireless surveillance system includes at least one wireless radio frequency reader for collecting data from the wireless memory apparatus, the apparatus comprising:

a tag antenna for wirelessly receiving signals from and transmitting signals to a remote tag reader;

an analog circuit for transferring data to the tag antenna;

a non-volatile tag memory for storing a unique tag serial number identification, wherein the non-volatile tag memory further stores a unique user identification number assigned to end users, a unique manufacturer identification number assigned to manufacturers, or both; and a digital circuit for transferring the unique tag serial number identification from the memory to the analog circuitry in preparation for transmission by the tag antenna; wherein the digital circuit is further configured for transferring the unique user identification number assigned to end users, the unique manufacturer identification number assigned to manufacturers, or both, to the analog circuitry in preparation for transmission by the tag antenna.

* * * * *